United States Patent [19]
Xavier

[11] Patent Number: 5,782,117
[45] Date of Patent: Jul. 21, 1998

[54] ANTI-THEFT DEVICE FOR MOTOR VEHICLES

[75] Inventor: Ellis Fernanda Xavier, Lugo, Italy

[73] Assignee: I.P. Innovative Products S.r.l., Ravenna, Italy

[21] Appl. No.: 648,425

[22] Filed: May 15, 1996

[30] Foreign Application Priority Data

May 25, 1995 [IT] Italy .................. BO 95A 00259
Dec. 21, 1995 [EP] European Pat. Off. .......... 95830532

[51] Int. Cl.$^6$ .................................................. B60R 25/00
[52] U.S. Cl. ........................ 70/226; 70/17; 70/238
[58] Field of Search .................. 70/14, 17–19, 70/209–212, 198–200, 225, 226, 237, 238; 188/32

[56] References Cited

U.S. PATENT DOCUMENTS

| | | | |
|---|---|---|---|
| 327,575 | 10/1885 | Mitchell | 70/17 |
| 372,836 | 11/1887 | Alden | 70/17 |
| 636,439 | 11/1899 | Maltby | 70/17 |
| 832,143 | 10/1906 | Mercer | 70/17 |
| 885,811 | 4/1908 | Ward | 70/17 |
| 1,132,486 | 3/1915 | Oster | 70/19 X |
| 1,147,423 | 7/1915 | Murphy | 70/17 |
| 1,216,660 | 2/1917 | Conway | 70/226 |
| 1,326,688 | 12/1919 | Perry | 70/18 |
| 1,441,328 | 1/1923 | Campbell | 70/18 X |
| 1,443,009 | 1/1923 | Davis . | |
| 1,488,893 | 4/1924 | Plouffe . | |
| 1,505,660 | 8/1924 | Moersch | 70/17 |
| 1,719,698 | 7/1929 | Gross | 70/17 |
| 1,819,813 | 8/1931 | Euenberger | 70/19 |
| 2,157,612 | 5/1939 | Kirk | 70/17 |
| 2,383,077 | 8/1945 | Powell | 70/17 |
| 3,828,590 | 8/1974 | Thiebault | 70/19 |
| 4,164,131 | 8/1979 | Desmond et al. | 70/226 X |
| 5,134,868 | 8/1992 | Bethards | 70/226 X |
| 5,315,848 | 5/1994 | Beyer | 70/226 X |
| 5,372,018 | 12/1994 | Smith | 70/56 X |
| 5,375,442 | 12/1994 | Hammer | 70/226 |
| 5,460,021 | 10/1995 | Taylor | 70/209 |

FOREIGN PATENT DOCUMENTS

| | | | |
|---|---|---|---|
| 203243 | 8/1920 | Canada | 70/18 |
| 203244 | 8/1920 | Canada | 70/18 |
| 218237 | 7/1909 | Germany . | |
| 248229 | 6/1912 | Germany | 70/17 |
| 317858 | 1/1920 | Germany | 70/17 |
| 335507 | 4/1921 | Germany | 70/226 |
| 367672 | 1/1923 | Germany | 70/17 |
| 161523 | 4/1922 | United Kingdom . | |

*Primary Examiner*—Suzanne Dino
*Attorney, Agent, or Firm*—Fay, Sharpe, Beall, Fagan, Minnich & McKee

[57] ABSTRACT

A mechanical anti-theft device for motor vehicles which includes, essentially, gripper means capable of engaging the cross section of a tire and a wheel rim of a wheel of the motor vehicle so that it closes on a pivot around the tire and the wheel rim; a support bar for the gripper means; an actuator rod, connected to the gripper means, which slides with relation to the bar in such a way that it can be moved, manually, between a first, unlocked, position, when it controls the opening of the gripper means and a second, locked, position, when it controls the closure of the gripper means around the tire and wheel rim; elastic means are also envisaged, placed between the bar and the rod, capable of holding the rod in the unlocked position, and also items, associated with the rod and capable of engaging with the bar in order to lock the rod with respect to the bar in the closed position.

11 Claims, 4 Drawing Sheets

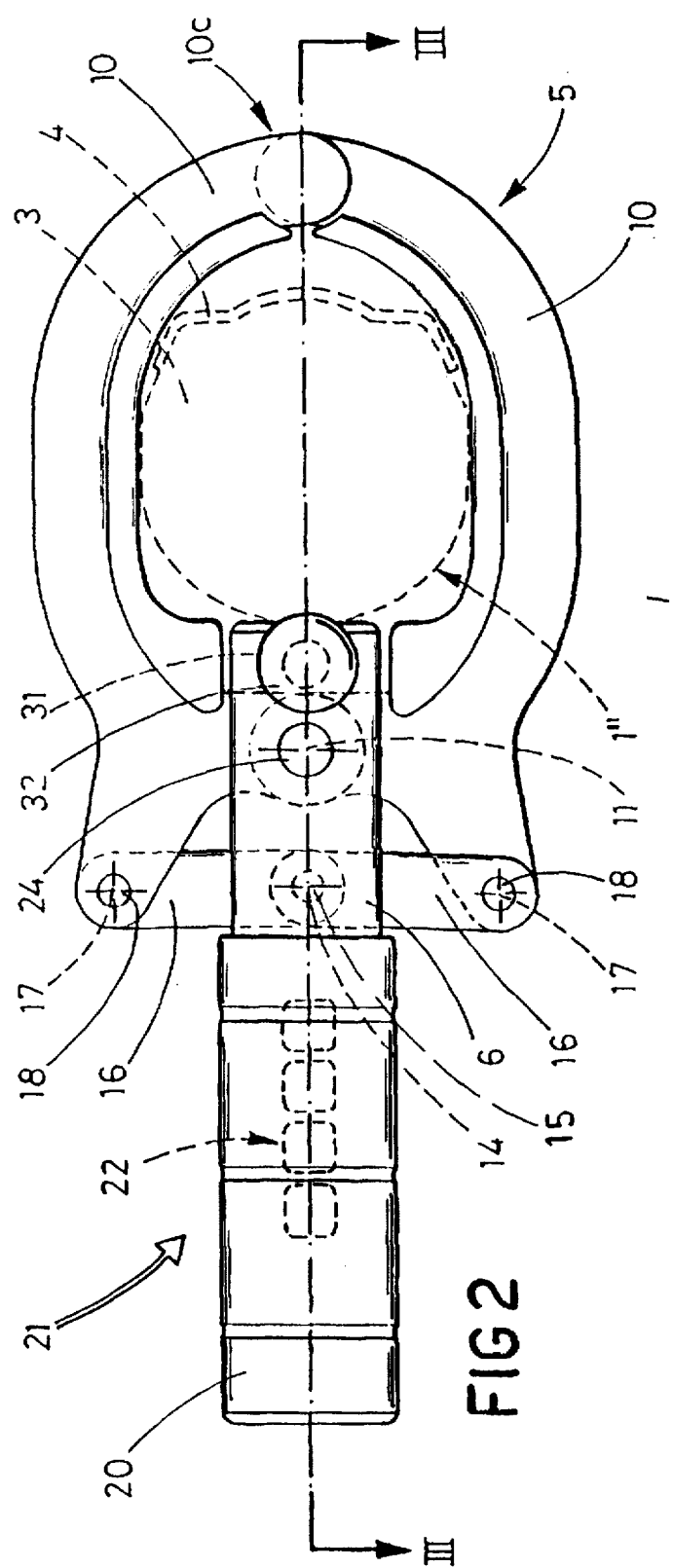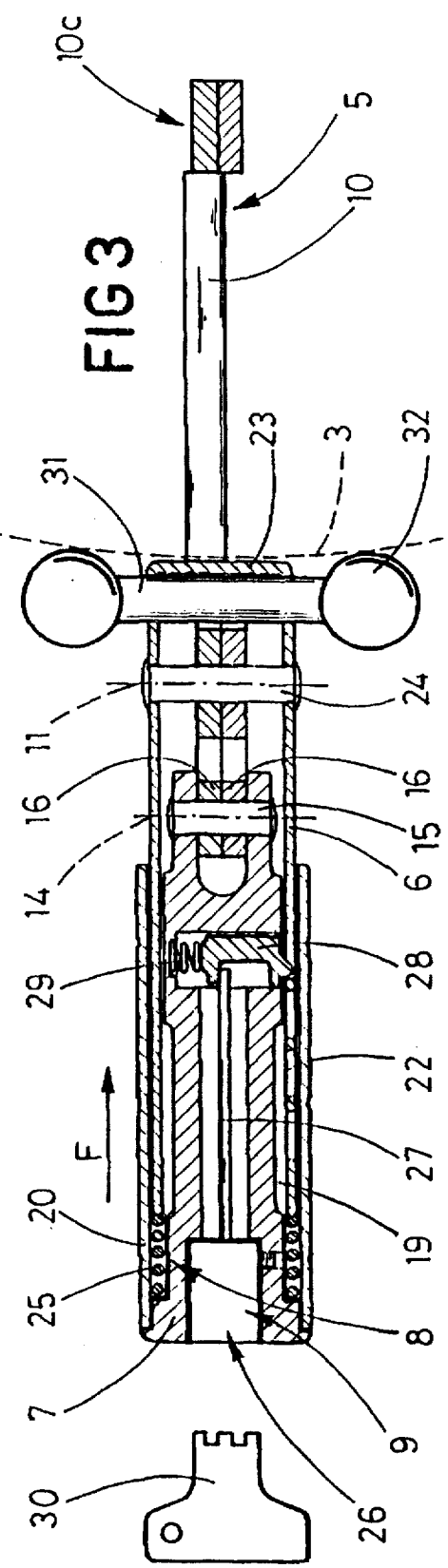

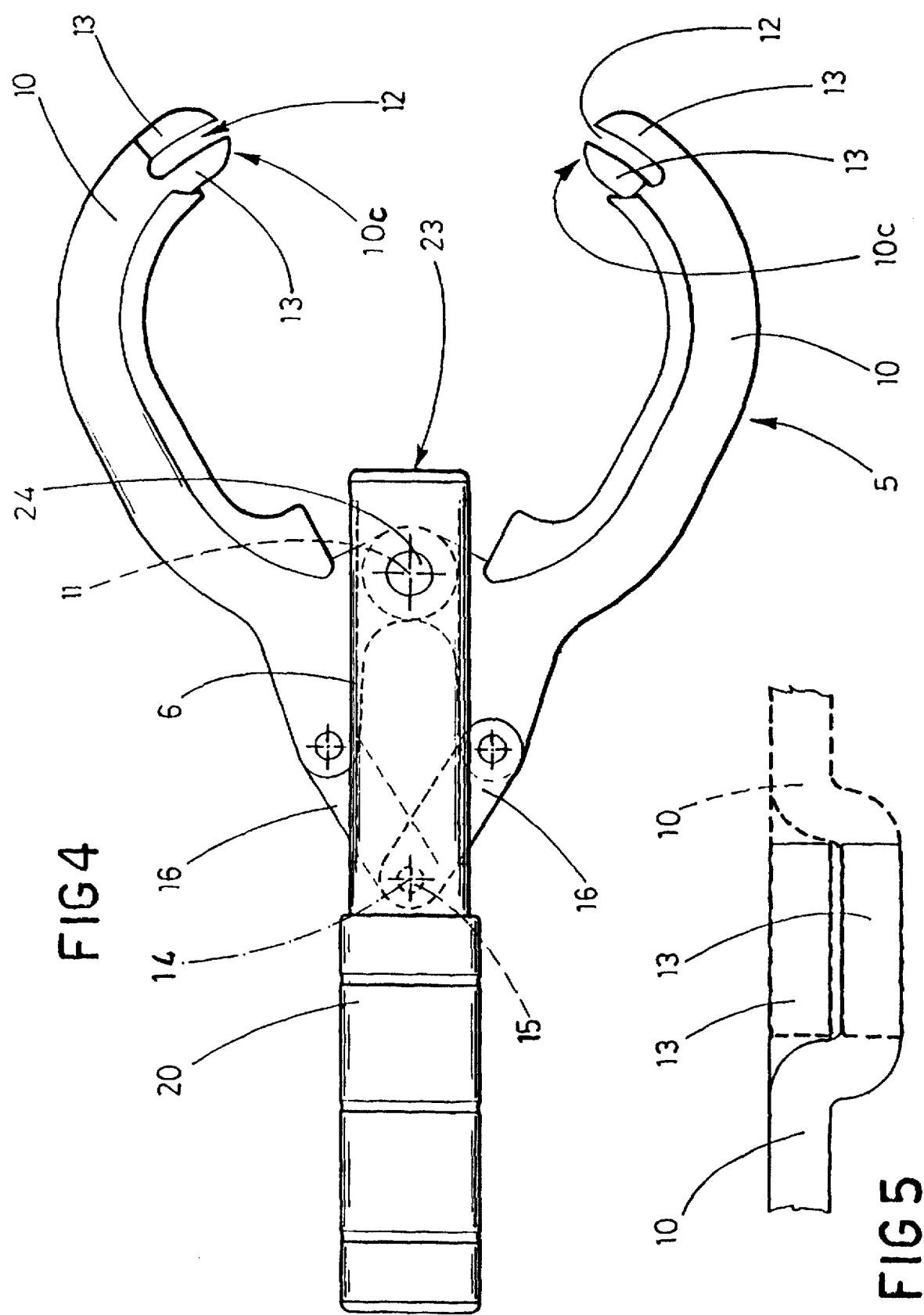

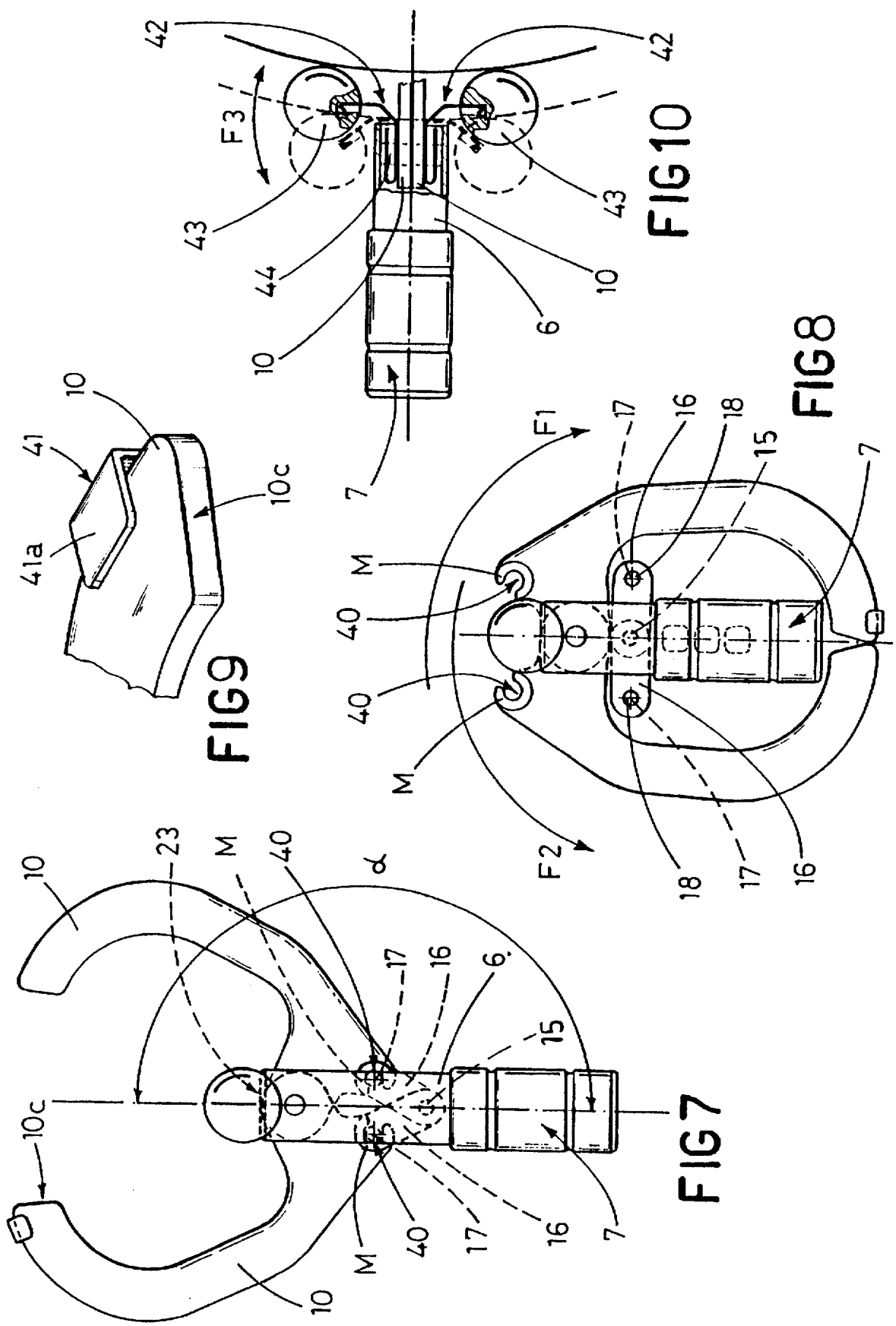

ANTI-THEFT DEVICE FOR MOTOR VEHICLES

BACKGROUND OF THE INVENTION

The present invention relates to a mechanical anti-theft device for motor vehicles, in particular the interference type which is capable of locking a wheel or a part of the tire and wheel rim, thereby preventing wheel rotation.

In the field of mechanical anti-theft devices for motor vehicles, used for locking one of the two wheels, there already exist manual anti-theft devices composed of an actual chain, with rings, for example, which can be inserted on the inside of the wheel rim and can be closed in by the side of the tire on the end rings using a known padlock.

Another well-known anti-theft device is a U-shaped rod which, by connecting its open side, engages with a portion of the wheel of the motor vehicle or by one or more of the wheel's spokes and then locked using a cylinder equipped with a couple of slots for the insertion of the free ends of the 'U'-shaped rod. This cylinder has a key locking system for keeping the rod in a position where it interferes with the wheel.

The use of these anti-theft devices is rather difficult, as laborious and uncomfortable manual work is required both for the positioning and the closing of the chain or the rod on the wheel (usually on the lower part of the wheel) and also for the opening and removal of the anti-theft device.

Another problem with these anti-theft devices is the large amount of space they take up when they are not being used: in fact, it is unusual to find in motor vehicles storage space of sufficient size for the storage of such anti-theft devices.

SUMMARY OF THE INVENTION

The aim of this invention, therefore, is to offer an anti-theft device for motor vehicles which can be easily handled, which can be positioned to and removed from one of the two wheels easily and with a limited number of manual operations, all possible in a device which takes up little space.

This aim is achieved by a anti-theft device which can be propped up or pointed with one of its ends against the tire, composed of two facing, shaped arms, more or less joined together by a pivot or C-shaped jaws, supported by a bar along which the control rod of the same arms is slid. This rod is effectively hinged to the same arms and can be removed manually, thanks to its sliding coupling on the bar, from its first, free position, in which the arms are kept open, to its second, locked position, when it makes the arms form a ring locking pattern around a section of the wheel and the wheel rim, which is maintained using the locking devices linked to the rod and activated, by controls, by the bar.

One of the advantages of this kind of anti-theft device lies in the extreme easiness and quickness of locking the wheel. This consists of propping or pointing the end of the support bar against the external part of the tire, then of using the rod to bring it into the second position, that of locking, in such a way as to close the arms to form a ring around the tire and the wheel rim, and finally in activating the locking devices to correctly position the rod in relation to the bar.

The unlocking of the anti-theft device is also quick and simple thanks to the abovementioned flexibility between the rod and the bar which, when the abovementioned locking devices become unlocked, bring the rod into its first, unlocked, position.

A further advantage of this kind of anti-theft device is its largely reduced size. Therefore, it can be easily stored in any motor vehicle storage space, thanks to the possibility of turning the arms in the opposite direction until they are closed like a compass with respect to the previous shape, in order to obtain a dimension which is all but halved with respect to the operating size of the anti-theft device.

BRIEF DESCRIPTION OF THE DRAWINGS

The technical features of the present invention, in accordance with the said aims, are clearly described in the claims herein and the advantages of the invention are more clearly shown in the detailed description below, with reference to the accompanying drawings, which illustrate an embodiment by way of example only, and in which:

FIG. 2 illustrates the same anti-theft device, as in FIG. 1, in its closed position, as seen from above;

FIG. 3 illustrates a cross section III—III of FIG. 2;

FIG. 4 illustrates the same anti-theft device, as in the previous Figures, in a non-operating position, as seen from above with some parts removed in order to highlight other parts, FIG. 5 illustrates a detail enlargement of one end of the arms which are part of the anti-theft device which is the subject of this invention, from a side view on an enlarged scale;

FIG. 8 illustrates the same anti-theft device as in the previous FIG. 7, in an extreme non-operating position as seen from above on a reduced scale with respect to the previous illustrations;

FIG. 9 illustrates a part of FIG. 7 in a prospective view and on an enlarged scale;

FIG. 10 illustrates one part of the anti-theft device in question, in particular the support balls for the tyre, a variation with respect to the previous illustrations. The illustration provides a side view with some parts removed in order to highlight other parts.

DESCRIPTION OF THE PREFERRED EMBODIMENTS

Figure 1:
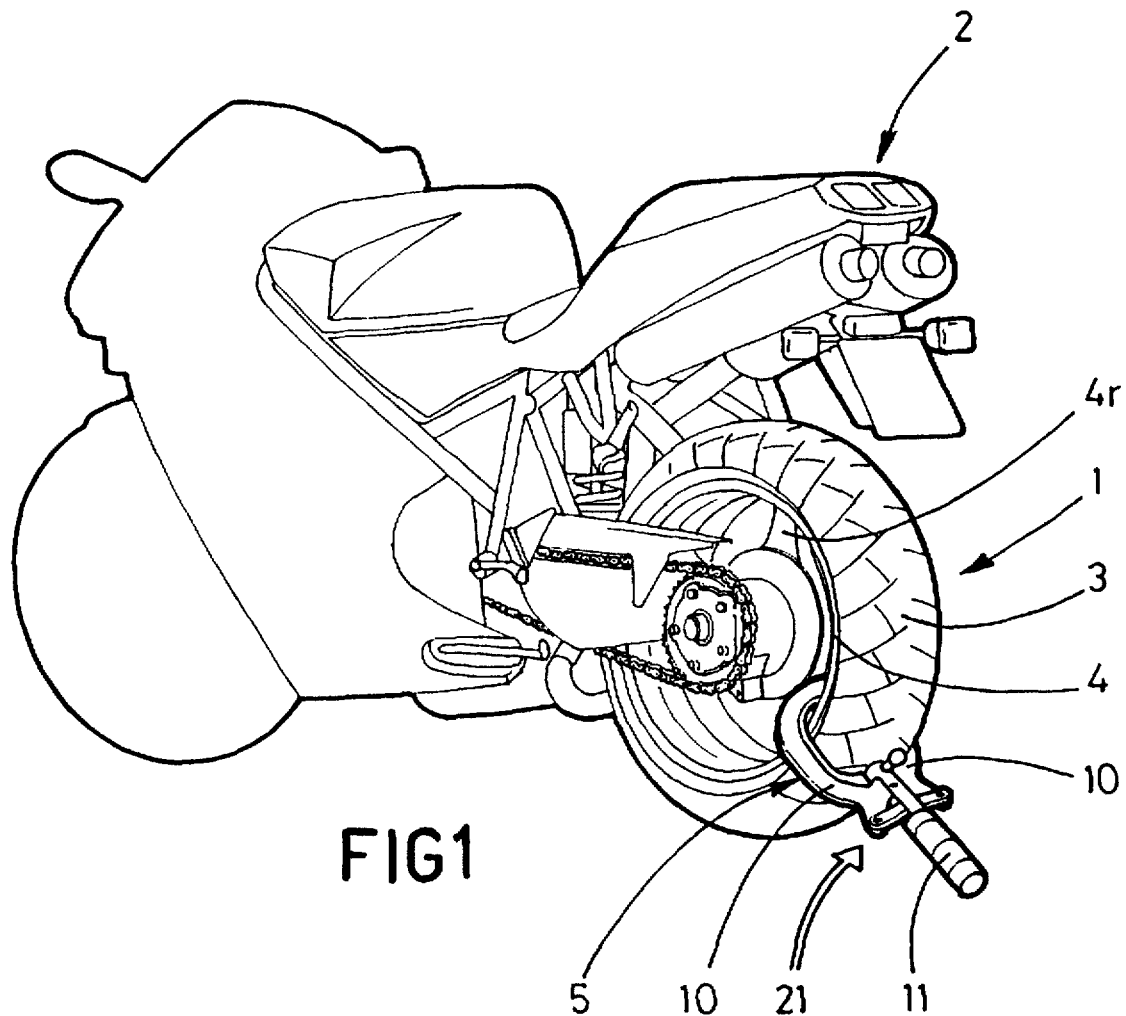
FIG. 1 illustrates the anti-theft device, which is the subject of this invention, applied to the back wheel of a motor vehicle, in perspective view.

With reference to the accompanying drawings, the invention relates to an anti-theft device (denoted z1) used for locking the wheel 1 of a motor vehicle 2, composed of a tire 3 and a wheel rim 4, equipped with spokes 4r.

The anti-theft device 21 includes essentially the gripping means, indicated as a whole by the number 5, a support bar 6, cylinder-shaped and including a cavity 19, openings 22, to be seen in FIGS. 3 and 4, and a supporting head 23 for the tire 3.

The aforementioned gripping means 5 are made up of a pair of facing, C-shaped arms 10, hinged with a pivot reciprocally at the ends of each one and to the aforementioned bar 6, in 11, by means of a pin 24: the shape of the arms 10 allows them to clamp the wheel radially, or a section of the tire 3 and relative portion of the wheel rim 4, as can be easily seen in FIG. 1.

In the enclosed illustrations, 20 represents a sliding tube assembled on the bar 6. This tube is joined to an actuator 7 which itself slides inside the cavity 19 in the same bar 6. Between the tube 20 and the bar 6, there is a return spring 25 forming the elastic means 8.

As can easily be seen in illustrations 2, 3 and 4, two levers 16 are hinged to the rod 7 at point 14, using a first pin 15. The two levers 16 are themselves hinged to their respective arms 10 at point 17 thanks to further pins 18. To ensure the two arms 10 are co-planar, the two levers 16 are placed on irregular planes to compensate for the overlapping of the arms themselves, necessary for their pivot hinging.

The rod 7 is equipped with a key locking system 26 (See FIG. 3), forming the locking means 9, comprising of a rod 27 and a bolt 28, suitable for connecting with the aforementioned openings 22 in the bar 6, activated by a related spring 29. The locking system 26 is controlled from the outside using a key 30.

The rod 7 can be slid manually, using the aforementioned tube 20, within the cavity 19 between the first, unlocked, position, when it is held back by the action of the return spring 25, and the second, locked, position, when it is held by the engagement of the aforementioned bolt 28 with one of the aforementioned openings 22, as demonstrated in FIG. 3.

When the anti-theft device is in its operating position, the two co-planar arms 10 come into contact or overlap with their own free ends 10c (see FIG. 2). In order to reinforce the pivot closure of the arms 10 at this end 10c, each end 10c can be equipped (see FIGS. 4 and 5) with an open slot 12, thereby establishing a shaping of the same forked end. One of the two prongs 13 formed by each slot 12 is shaped in such a way that it is developed on a different plane with respect to the other, so as to allow the reciprocal coupling of the two ends 10c of the arms, by means of overlapping of the respective prongs 13, corresponding to the aforementioned locking position of the arms themselves. It is obvious that the shaped prong 13 of one end 10c overlaps with the non-shaped prong 13 of the opposite end.

A further supplementary element of the anti-theft device in question is illustrated in FIGS. 2 and 3. The bar 6, in fact, is equipped with a second rod 31 which diametrically passes through the bar itself, corresponding to its own connecting head 23. This second rod 31 extends on a plane perpendicular to the plane of development of the arms 10 and is equipped with a pair of support elements 32 for the tire 3 at each respective end which, as can be seen from the illustration, consist of balls 32.

The balls 32, in practice, represent two further points of contact with the tire 3 (see FIG. 3) which allows an easier positioning of the anti-theft device on the tire itself. As well as this, these balls 32, when the anti-theft device is in its locked position, act as support elements for the anti-theft device itself thanks to their stable position on the tire 3.

As hereto described, the anti-theft device for motor vehicles in question functions in the following way: starting from a situation in which the anti-theft device 21 is non-operative, as seen in FIG. 4, the locking system 26 is open, the tube 20 is pushed back and the spring 25 pushes the rod 7 into an unlocked position. The rod 7 itself then, using the levers 16, keeps the arms 10 of the jaw open.

To then put the anti-theft device 21 into an operating position, the bar 6 with its own head 23 is positioned against the tread of the tire 3. Holding the anti-theft device 21 with only one hand, using the metal bar 20 and pushing the same metal bar towards the bar 6, the rod 7 slides into the cavity 19 (see Arrow F in FIG. 3), thereby bringing the anti-theft device into its locking position: in such a way, the arms 10 are commanded, by the levers 16, to rotate around the pin 24 and to close themselves around the portion of the tire 3 and relating wheel rim 4 up to the point of complete locking of the arms 10 represented by the coupling of the two ends 10a. By means of this action, the bolt can slide into one of the openings 22 of the bar 6, as shown in FIG. 3, due to turning the key 30, which locks the rod 7 and the arms 10 in the aforementioned closing position (see FIG. 2).

In this condition, the anti-theft device 21 prevents the rotation of the wheel 1 in the illustration, the back wheel, thereby preventing movement of the motor vehicle 2.

To unlock the wheel 1, the locking system 26 must be opened with the key 30, in such a way that the bolt 28 comes away from the opening 22: the rod 7, activated by the spring 25, and sliding in the opposite direction from its previous movement in the cavity 19, brings the arms 10 once again into an unlocked position so that the anti-theft device 21 can be removed from the wheel 1.

Figure 6:
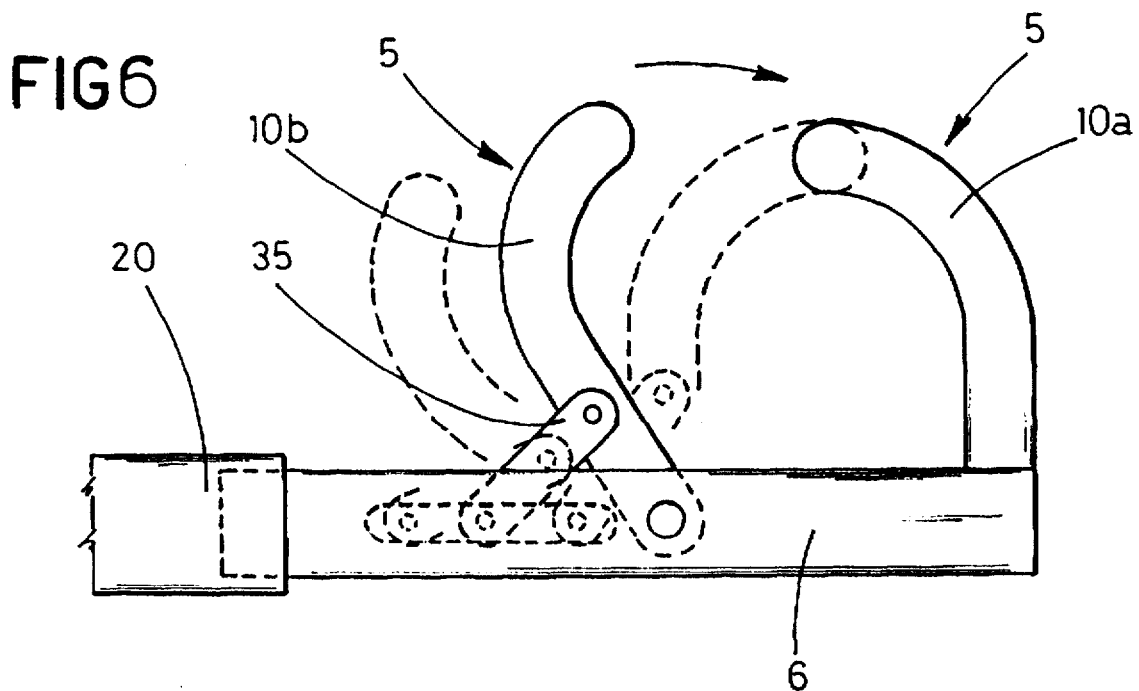
FIG. 6 illustrates one variation of the anti-theft device, seen schematically from above, FIG. 7 illustrate another variation seen in an extreme opereating position from above on a reduced scale with respect to the previous illustrations.

FIG. 6 illustrates a position of the anti-theft device which is a variation on the positions described up till now. Here the two arms 10a and 10b are in a curved shape and are facing each other.

The arm indicated by 10a is rigidly secured to the free end of the bar 6 and extends laterally on the same bar thus forming a hook shape together with the latter. The second arm 10b, on the other hand, is hinged to the bar 6, in the area closest to the tube 20, and to the rod 7 by means of a corresponding lever 35: in this way the second arm 10b is moved into the aforementioned wheel 1 locking and unlocking positions by, respectively, the approach and the withdrawal of the second arm 10b with respect to the first 10a. In this specific case, the clamping of the wheel 1 is achieved with the lateral insertion of the first arm 10a in the inside of the wheel 1 on the side of the wheel rim 4, thereby positioning the bar 6 in contact with the side part of the same wheel. Following this, the second arm 10b is engaged, by sliding the tube 20 towards the wheel 1, while the user blocks this movement by holding the arm 10a firmly. The unlocking procedure is carried out in a similar way to the operation just described.

A further structural variation of the anti-theft device in question is illustrated in FIGS. 7 and 8 where the two arms 10 are equipped with respective open slots 40 on a portion of their own circumference i.e. on the outside part of their arms 10. These slots 40 allow the linking, at point 17, between the arms 10 and the aforementioned levers 16 by means of the aforementioned relative pin 18.

This particular structure of the slots 40 allows the two arms 10 to be moved by the user from an extreme operating position of the two arms (see FIG. 7) where the slots 40 are coupled with the pins 18 of the levers 16 so that they can then be put into the closed position, as previously described, and an extreme non-operating position, where the arms 10 are rotated and closed in a resting position (see FIG. 8) in order to obtain the shape which takes up least space.

More particularly, each of the arms 10 can be rotated by around 180 degrees indicated by α in FIG. 7, thanks to the possibility of releasing the pins 18 from the relative slots 40 and, according to the directions, indicated by F1 and F2, on the opposite side to one another. In this way, the arms 10 encircle the aforementioned bar 6 and the actuator rod 7, preferably brought into the locking position, inside the space occupied by the same closed arms when in the resting position and with the ends touching, thereby forming a shape of an extremely reduced size for the whole anti-theft device.

In this specific case, to be able to obtain a secure moving of the arms 10 when they are in the operating position, it is preferable to cover the internal contact surface of each slot 40 with the relative pin 18 made of M material with a high friction co-efficient, such as rubber, for example, or another resistant material.

A further structural variant, illustrated in FIGS. 7, 8 and 9, has one of the arms 10 equipped, one of its own end-parts 10c is fitted with a tab 41 which has a portion 41a folded at a right angle in the direction of the same arm thus forming, together with the facing arm 10 surface, a sliding space for the other arm 10 when they are closed.

To be able to have maximum dimensional flexibility of the anti-theft device with respect to the multiple tire 3 and wheel rim 4 models, the aforementioned rod 6 can be equipped (see FIG. 10) in particular with an opposing pair of flexible spring elements 42, protruding from the end of the same rod and supporting the elements 43 that rest against the tire 3 which again in this case are shown, for illustrative purposes only, by relative balls, inasmuch as such a shape makes it possible to obtain a secure hold against the tire 3.

In the example illustrated, the flexible elements 42 are represented by two single leaf springs of reduced thickness bound by a single pin 44 which diametrically passes through the rod 6; these leaf springs 42 are positioned in such a way that they project at right angles from the rod 6 and allow the balls 43 to be moved radially or axially with respect to the aforementioned support head 23. More precisely, these flexible elements 42, like the second rod 31 discussed previously, protrude from the rod 6 and form along a plane perpendicular to the plane of the arms 10: in this way, this creates a pair of support points, which are adjustable, where the anti-theft device is resting against the tire 3.

In other words, the elastic movement of the flexible elements 42 ensure that the balls 43 rest against the tire 3, adjusting themselves by retreating or advancing with respect to the aforementioned support head 23 (see also Arrow F3 in FIG. 10), during the closing phase of the arms 10 dependent upon the total space occupied by the sum of the cross sections of the same tire and the wheel rim 4 of the vehicle or upon the distance between the aforementioned support head 23 of the rod 6 and the free ends of the arms 10 necessary for carrying out the correct and complete locking of the same gripper means.

This particular technique allows an extremely secure and practical locking of the anti-theft device and at the same time allows for a good flexibility of use on many tire and wheel models. Thanks to its extremely compact structure, the anti-theft device 21 takes up less space and can be easily carried in any motor vehicle storage space in a space under the saddle, for example or inside any holder provided by motor vehicle accessories back trunk, tank bag, etc.

As can be deduced from the previous description, it is clear that the anti-theft device can be positioned and closed, with a few simple manual operations, radially around a portion of the wheel of a motor vehicle and also removed from it, using the locking bolt.

The safety of the locking is even greater thanks to the coupling of the ends of the arms which prevents any possible forcing of them by means of any pushing or pulling on the arms in a direction which is perpendicular to them.

A further element which allows an easier and more comfortable application of the anti-theft device is the rod with balls, which increases the surface area of support for the anti-theft device on the tire, in addition to the head of the bar during assembly and at the same time becomes a support for the anti-theft device itself when this latter is applied to the tire.

What is claimed:

1. An anti-theft device in combination with a vehicle wheel including a rim, at least one aperture through the rim, and a tire mounted to the rim and having an external rolling surface, the anti-theft device comprising:

first and second mutually opposing C-shaped arms each having a first end, a second end, and an intermediate portion, the first ends of said C-shaped arms passing through the at least one aperture to encompass the tire and the rim in a locked position of the vehicle anti-theft device;

a support bar spaced laterally between said second ends of said C-shaped arms and having a first pivot member positioned proximate the tire, said intermediate portions of said C-shaped arms being pivotally connected to said first pivot member;

an actuator rod slidably positioned within said support bar and having a second pivot member associated therewith;

first and second lever arms each having one end thereof pivotally connected to said respective second ends of said C-shaped arms and another end thereof pivotally connected to said second pivot member;

spring means interposed between said support bar and said actuator rod for urging said support bar and said actuator rod axially apart to define an unlocked position of the vehicle anti-theft device wherein said first ends of said C-shaped arms are urged laterally apart and said second ends of said C-shaped arms are urged laterally inward toward said support bar, each of said lever arms forming an acute angle with said support bar in said unlocked position;

lock means for preventing relative axial movement between said actuator rod and said support bar against a biasing force generated by said spring means when in said locked position of the vehicle anti-theft device; and when in said locked position, said actuator rod being urged axially toward said support bar against said biasing force, said first ends of said C-shaped arms being urged together, said second ends of said C-shaped arms being urged laterally apart, and each of said lever arms extending substantially perpendicular to said support bar.

2. The combination of claim 1, wherein each of said first ends of the C-shaped arms includes an open slot defining two prongs, one of the prongs being oriented above the other of the prongs to facilitate an overlapping engagement with mutually opposing prongs of the other C-shaped arm in the locked position.

3. The combination of claim 1, wherein the support bar includes a cavity, a first portion of the actuator being slidably positioned within the cavity, an outer tube being joined to the actuator rod and surrounding at least portion of the support bar, and the spring means being positioned between the outer tube and a second portion of the actuator rod.

4. The combination of claim 1, further including a second rod extending through the support bar proximate a first end thereof, the second rod being oriented substantially perpendicular to a plane of the C-shaped arms, the second rod including a contact element positioned at each end thereof for contacting the external rolling surface.

5. The combination of claim 4, wherein the contact elements are spherically-shaped.

6. The combination of claim 1, wherein each of said lever arms are removably secured to said second ends of said C-shaped arms, said second ends each defining an open slot for engaging the respective lever arms, the open slots disengaging from the lever arms in an extreme non-operating position wherein said first end of each C-shaped arm is positioned proximate a remote end of the support bar by pivoting the C-shaped arms in opposing directions.

7. The combination of claim 6, wherein the open slots of the C-shaped arms are coated with material having a high-coefficient of friction.

8. The combination of claim 1, wherein said first C-shaped arm includes a tab positioned proximate said first end thereof, the tab having a folded portion which cooperates with the first C-shaped arm to define a sliding space for said second C-shaped arm when in the locked position.

9. The combination of claim 1, further including a flexible spring element positioned proximate the first pivot member, the spring element including two cantilevered spring arms extending transversely from the support bar in substantially opposing directions, and a contact element positioned at each free end of the respective spring arms for resiliently contacting the tire.

10. The combination of claim 9, wherein the contact elements are spherically-shaped.

11. The combination of claim 9, wherein the contact elements are movable along an arcuate path.

* * * * *

UNITED STATES PATENT AND TRADEMARK OFFICE
CERTIFICATE OF CORRECTION

PATENT NO. : 5,782,117
DATED : July 21, 1998
INVENTOR(S) : Ellis Fernanda Xavier It is certified that error appears in the above-identified patent and that said Letters Patent is hereby corrected as shown below:

Column 6, line 53, after "actuator", insert:

---rod---.

Signed and Sealed this

Fifth Day of January, 1999

Attest:

Attesting Officer

Acting Commissioner of Patents and Trademarks